(12) United States Patent
Little et al.

(10) Patent No.: US 8,818,194 B2
(45) Date of Patent: Aug. 26, 2014

(54) TUNABLE OPTICAL DEMULTIPLEXER

(75) Inventors: Brent E. Little, Glen Head, NY (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 715 days.

(21) Appl. No.: 12/495,343

(22) Filed: Jun. 30, 2009

(65) Prior Publication Data

US 2010/0329679 A1    Dec. 30, 2010

(51) Int. Cl.
*H04J 14/02* (2006.01)
*G02B 6/26* (2006.01)

(52) U.S. Cl.
USPC .............................................. 398/82; 385/17

(58) Field of Classification Search
None
See application file for complete search history.

(56) References Cited

U.S. PATENT DOCUMENTS

| | | | |
|---|---|---|---|
| 6,256,428 B1 * | 7/2001 | Norwood et al. | 385/17 |
| 6,304,350 B1 * | 10/2001 | Doerr et al. | 398/9 |
| 6,512,615 B2 * | 1/2003 | Wu et al. | 398/87 |
| 6,570,686 B1 * | 5/2003 | Kim | 398/79 |
| 6,826,334 B2 * | 11/2004 | Yoneda | 385/37 |
| 7,043,158 B1 * | 5/2006 | Kuroyanagi et al. | 398/56 |
| 7,245,837 B2 * | 7/2007 | Sakamoto et al. | 398/193 |
| 7,801,446 B2 * | 9/2010 | Little et al. | 398/85 |
| 7,840,103 B2 * | 11/2010 | Chen et al. | 385/24 |
| 2002/0041414 A1 * | 4/2002 | Oguma | 359/130 |
| 2003/0115042 A1 * | 6/2003 | Chen et al. | 704/200.1 |
| 2006/0133719 A1 * | 6/2006 | Wang et al. | 385/15 |
| 2010/0021166 A1 * | 1/2010 | Way | 398/79 |
| 2010/0086307 A1 * | 4/2010 | Mitchell et al. | 398/79 |

OTHER PUBLICATIONS

Carmen Vazquez, Demultiplexers for ultranarrow channle spacing based on Mach-Zehnder and ring resonators, Sep. 2004, Society of photo-optical instrumentation engineers, pp. 2080-2086.*
R.Hess, All-optical demultiplexing of 80 to 10 Gb's signals with monolithic integrated high-performance Mach-Zehnder Interferometer, Jan. 1998, IEEE photonics technology letters vol. 10 No. 1 pp. 165-167.*
B.H. Verbeek, Integrated four channle Mach-Zehnder Multi/demultiplexer fabricated with phosphorous doped SiO2 waveguides on Si, Jun. 1998, Journal of lightwave technology vol. 6 No. 6, pp. 1011-1015.*
K.I. Kang, Demonstration of all-optical Mach-Zehnder demultiplexer, Apr. 1995, Electronic letters vol. 31 No. 9, pp. 749-750.*

* cited by examiner

*Primary Examiner* — Ken Vanderpuye
*Assistant Examiner* — Amritbir Sandhu
(74) *Attorney, Agent, or Firm* — David L. Soltz

(57) ABSTRACT

A tunable optical demultiplexer includes a control circuit and one or more heaters thermally coupled to waveguides of an optical demux. The control circuit is in signal communication with the one or more heaters and includes a processor coupled to a memory. The control circuit is configured to receive an optical channel group (OCG) identification signal and adjust the power delivered to the heaters in response to the OCG identification signal and based on parameter values stored in the memory. The optical demux outputs a plurality of optical signals at a corresponding one of a plurality of outputs. The transmission characteristics of the optical demux are varied depending on the amount of power delivered to the heaters. The varying of the transmission characteristics of the optical demux adjusts the spectral shifting of the plurality of wavelengths output by the optical demux.

27 Claims, 5 Drawing Sheets

TUNABLE OPTICAL DEMULTIPLEXER

FIELD OF DISCLOSURE

The disclosed systems relate to the transmission of optical signals. More specifically, the disclosed system and methods relate to tunable demultiplexers for demultiplexing of wavelength division multiplexed (WDM) optical signals.

BACKGROUND

Optical demultiplexers are frequently used in optical communication systems. One type of optical demultiplexer is an arrayed waveguide grating (AWG), which includes an input to a first free space region, a plurality of channel waveguides, a second free space region and a plurality of outputs. An AWG may be configured to receive a wavelength division multiplexed (WDM) optical signal having a plurality of channels, each at a particular wavelength. The WDM signal propagates through the first free space region into the plurality of channel waveguides. These waveguides have different lengths and thus, each signal undergoes a different phase shift as it exits the waveguides into the second free space region. The light from the second free space region interferes at the output of the AWG such that each output receives only light having a particular wavelength. Because the refractive indices of the channel waveguides may be changed with the application of heat, thin film heaters have been employed to modify the phase of the propagating light through these waveguides to modify the particular wavelengths selected by the AWG. However, the temperature of the heaters is usually configured during implementation within a transmission system based upon a particular spectral spacing of the WDM signal wavelengths and cannot be changed to tune the AWG to select wavelengths having a different spectral spacing.

Mach Zehnder Interferometers ("MZ") have also been employed as demultiplexers. Generally, an MZ includes a first beam splitter that splits an incoming light signal into two parts and supplies each part onto a respective one of a pair of optical waveguides that may have varying lengths (asymmetric). The split light is then recombined by a second beam splitter and, depending on the relative phase acquired by the light along the two waveguides, the light may undergo constructive or destructive interference. MZs may be configured to separate individual wavelengths supplied to the input of the MZ and/or a plurality of MZs can be cascaded to separate groups of wavelengths from a WDM signal. However, MZs also suffer from the lack of tunability to select different wavelengths or groups of wavelengths from a WDM optical signal Other optical demultiplexers that may be employed to select particular wavelengths in optical transmission systems include a cascade of Bragg gratings. However, a cascade of Bragg gratings, like an AWG or a cascade of MZs, suffers from the drawback that the demultiplexed output wavelengths are fixed at the time the demultiplexer is fabricated. Accordingly, these conventional demultiplexers only operate with certain wavelengths and have poor response characteristics. In particular, if the wavelengths selected to be demultiplexed from a WDM signal vary from the wavelengths that the demultiplexer is tuned to select, then cross-talk between the channels and an associated power loss occurs thereby compromising the optical transmission system. Accordingly, a tunable optical demultiplexer for use in optical communication systems is desirable to overcome these drawbacks.

SUMMARY

Exemplary embodiments of the present invention are directed to an optical device used to demultiplex particular optical channels from a WDM signal. In an exemplary embodiment, an optical device includes an optical demultiplexer and a control circuit coupled to the optical demultiplexer to control the selection of optical channels having particular transmission characteristics. The control circuit includes a memory configured to store first and second parameter values. The control circuit generates a first control signal based on the first parameter value in response to a first input to the control circuit. The optical demultiplexer has a first transmission characteristic in response to the first control signal. The first transmission characteristic of the optical demultiplexer includes a first plurality of transmission maxima, each of which correspond to a first plurality of wavelengths. Each of the first plurality of wavelengths is separated from the other wavelengths by a spectral spacing conforming to a first wavelength grid. The control circuit generates a second control signal based on the second parameter value in response to a second input to the control circuit. The optical demultiplexer has a second transmission characteristic in response to the second control signal. The second transmission characteristic of the optical demultiplexer includes a second plurality of transmission maxima, each of which correspond to a second plurality of wavelengths. Each of the second plurality of wavelengths is separated from one another by the spectral spacing that conforms to a second wavelength grid. The second wavelength grid is spectrally shifted relative to the first wavelength grid.

DETAILED DESCRIPTION

Figure 1:
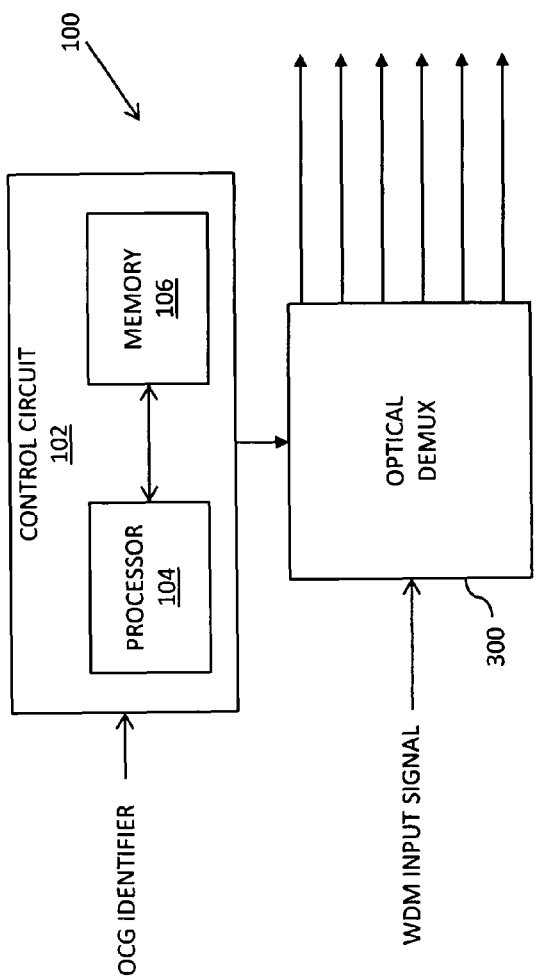
FIG. 1 is a block diagram of a tunable optical system.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

A tunable optical demultiplexer (demux) includes a control circuit and one or more heaters thermally coupled to an optical demux. The control circuit is in signal communication with the one or more heaters and includes a processor coupled to a memory. The control circuit is configured to receive an optical channel group (OCG) identification signal and, in response, send a signal to adjust the power delivered to the heaters based on parameter values stored in the memory. The optical demux outputs a plurality of optical signals at particular wavelengths at a corresponding one of a plurality of outputs. The transmission characteristics of the optical demux vary (i.e. the particular plurality of wavelengths outputted) depending on the amount of power delivered to the heaters. The varying of the transmission characteristics of the optical demux adjusts the spectral shifting of the plurality of wavelengths output by the optical demux and enables the demux to be optimized for the characteristics of a wavelength division multiplexed (WDM) optical signal it receives at its input. The optimization of the demux minimizes cross-talk between adjacent channels and improves the response of the demux.

FIG. 1 is a block diagram of an exemplary embodiment of a tunable optical device 100 including a control circuit 102 having a processor 104 in signal communication with a memory 106. The processor 104 may be a microcontroller, microprocessor, or other computational device that may execute instructions in response to receiving an OCG identification signal. In an open loop system implementation, the OCG identification signal may identify particular wavelengths included in a WDM optical input signal having a plurality of wavelengths received at the input of optical demux 300. The OCG identification signal may be received from a network controller in response to a user selecting a specific OCG to be demultiplexed from the WDM optical signal. An OCG identification signal may also be received in a closed loop system implementation wherein feedback from the outputs of the demux 300 is used as the OCG identification signal to optimize the demultiplexer based on its response.

The memory 106 may be a random access memory (RAM) or a read only memory (ROM). Examples of RAMs include, but are not limited to, static random access memory (SRAM) and dynamic random access memory (DRAM). Examples of ROMs include, but are not limited to, programmable read only memory (PROM), erasable programmable read only memory (EPROM), and electrically erasable programmable read only memory (EEPROM). Memory 106 stores a plurality of parameter values that identify, or otherwise correspond to, the power, current, or voltage to be applied to an array of one or more heaters (as referenced as 350 in FIG. 3) based on a received OCG identification signal. Memory 106 may include a look-up table in which certain parameter values are associated with the OCG identification signal. For example, for a first OCG identification signal a first set of heater parameters will be used thereby causing demux 300 to select a first OCG having a first spectral spacing between the channels within the selected group. Similarly, for a second OCG identification signal a second set of heater parameters will be used thereby causing demux 300 to select a second OCG having a second spectral spacing between the channels within the selected group. The parameter values may be determined prior to installing the optical demux 300 in an optical transmission system in order to demux a particular OCG having an associated spectral spacing. In addition, the parameter values may be determined after installation to demux an OCG having a different spectral spacing, thereby allowing tunability of the particular OCG demultiplexed by demux 300. In this manner, control circuit 102 may be used to tune the optical demux 300 to demultiplex particular optical channels to minimize cross-talk between adjacent channels and/or to maximize the selection of the demux 300 depending on the spectral spacing of the WDM optical signal.

As described above, the optical demux 300 is configured to receive a WDM optical input signal having a plurality of channels and output one or more of the channels at a respective output. Each of the channels corresponds to a wavelength of the WDM optical input signal. The channels are isolated from one another by the optical demux as described below.

Figure 2A:
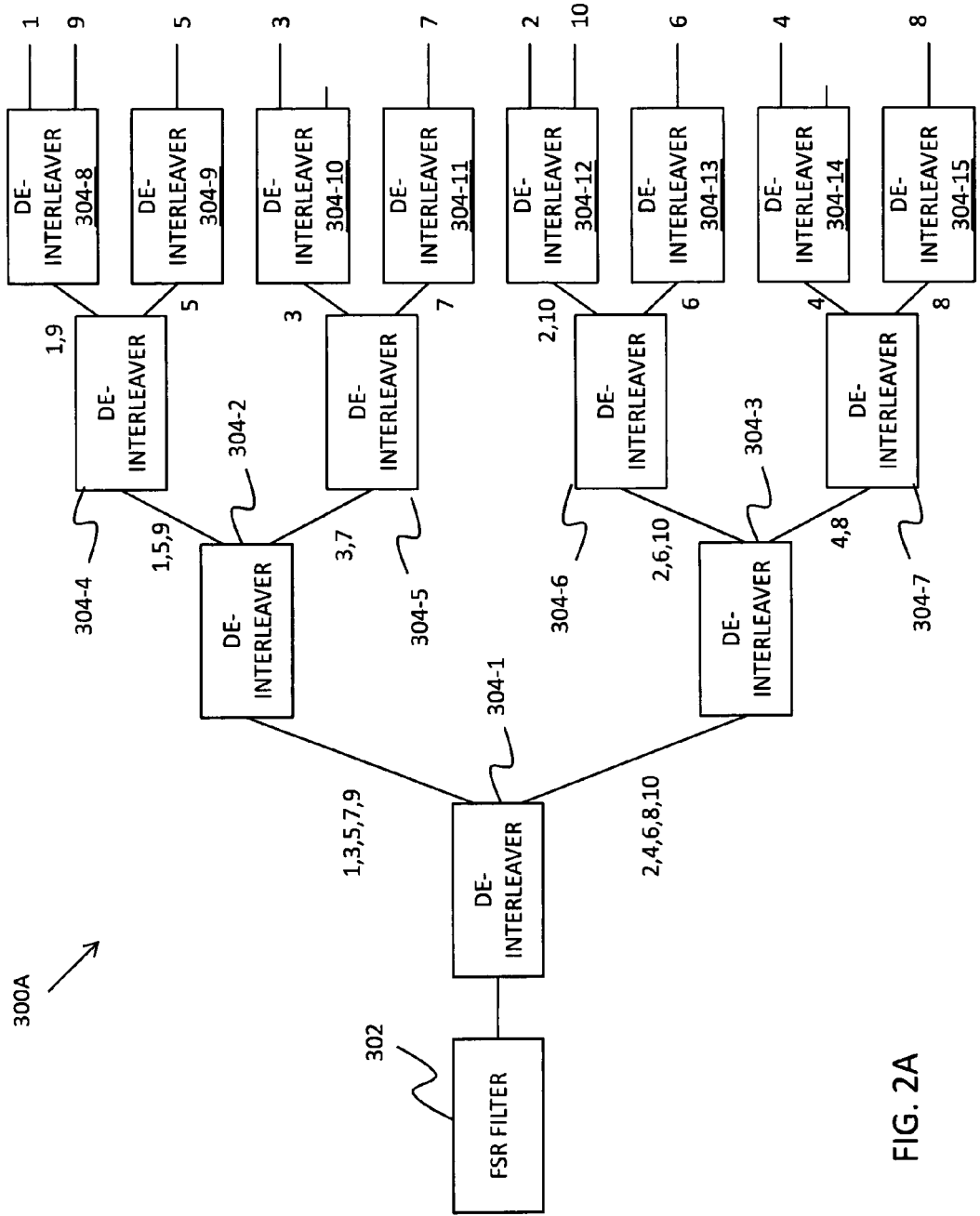
FIGS. 2A-2C illustrate several embodiments of optical demultiplexers 300 in accordance with the tunable optical system illustrated in FIG. 1.

FIG. 2A illustrates an exemplary embodiment 300A of demux 300 shown in FIG. 1. In particular, optical demux 300A includes a free spectral range filter 302 and a cascade of de-interleavers 304. Mach-Zehnder (MZ) interferometers may be used as de-interleavers 304, although one skilled in the art will understand that other optical devices may be cascaded to demultiplex a WDM optical input signal such as, for example, a passive ring-assisted Mach-Zehnder, ring resonator add-drop filters, planar Bragg gratings, planar co-directional gratings, or the like. The output of the FSR filter 302 is received at a first de-interleaver 304-1 for de-interleaving the channels of the received WDM optical signal. For example, the WDM optical input signal may include ten (10) channels, e.g., channels 1, 2, 3, 4, 6, 7, 8, 9, 10, each corresponding to a particular wavelength of the WDM optical input signal. The channels may conform to a predetermined grid in which adjacent channels are spectrally spaced from one another. For example, channels of the WDM optical input signal may be spaced from adjacent channels by 400 GHz, although one skilled in the art will understand that other spectral spacings may be implemented. The first de-interleaver 304-1 may output channels 1, 3, 5, 7, and 9 at one output port and channels 2, 4, 6, 8, and 10 at the other output port. Accordingly, the adjacent channels output from the first de-interleaver 304-1 (e.g., channels 3 and 5) may be spaced from each other by 800 GHz.

De-interleaver 304-2 is coupled to an output of de-interleaver 304-1 such that it receives wavelengths 1, 3, 5, 7, and 9, and de-interleaver 304-3 is coupled to an output of de-interleaver 304-1 such that it receives channels 2, 4, 6, 8, and 10. De-interleaver 304-2 separates channels 1, 5, and 9 from channels 3 and 7 and outputs them to de-interleaver 304-4 and de-interleaver 304-5, respectively. De-interleaver 304-3 separates channels 2, 6, and 10 from channels 4 and 8 and outputs the separated channels to de-interleaver 304-6 and de-interleaver 304-7, respectively.

De-interleaver 304-4 separates channels 1 and 9 from channel 5 and outputs channels 1 and 9 to de-interleaver 304-8 and outputs channel 5 to de-interleaver 304-9. De-interleaver 304-5 receives channels 3 and 7 and outputs channel 3 to de-interleaver 304-10 and channel 7 to de-interleaver 304-11. De-interleaver 304-6 receives channels 2, 6, and 10 from de-interleaver 304-3 and outputs channels 2 and 10 to de-interleaver 304-12 and channel 6 to de-interleaver 304-13. De-interleaver 304-7 receives channels 4 and 8 from de-interleaver 304-3 and outputs channel 4 to de-interleaver 304-14 and channel 8 to de-interleaver 304-15. Each of the de-interleavers 304-8 through 304-15 output a single channel, e.g., an optical signal of a single wavelength, at an output. Accordingly, the WDM optical input signal is demultiplexed by the cascade of de-interleavers 304.

Figure 2B:
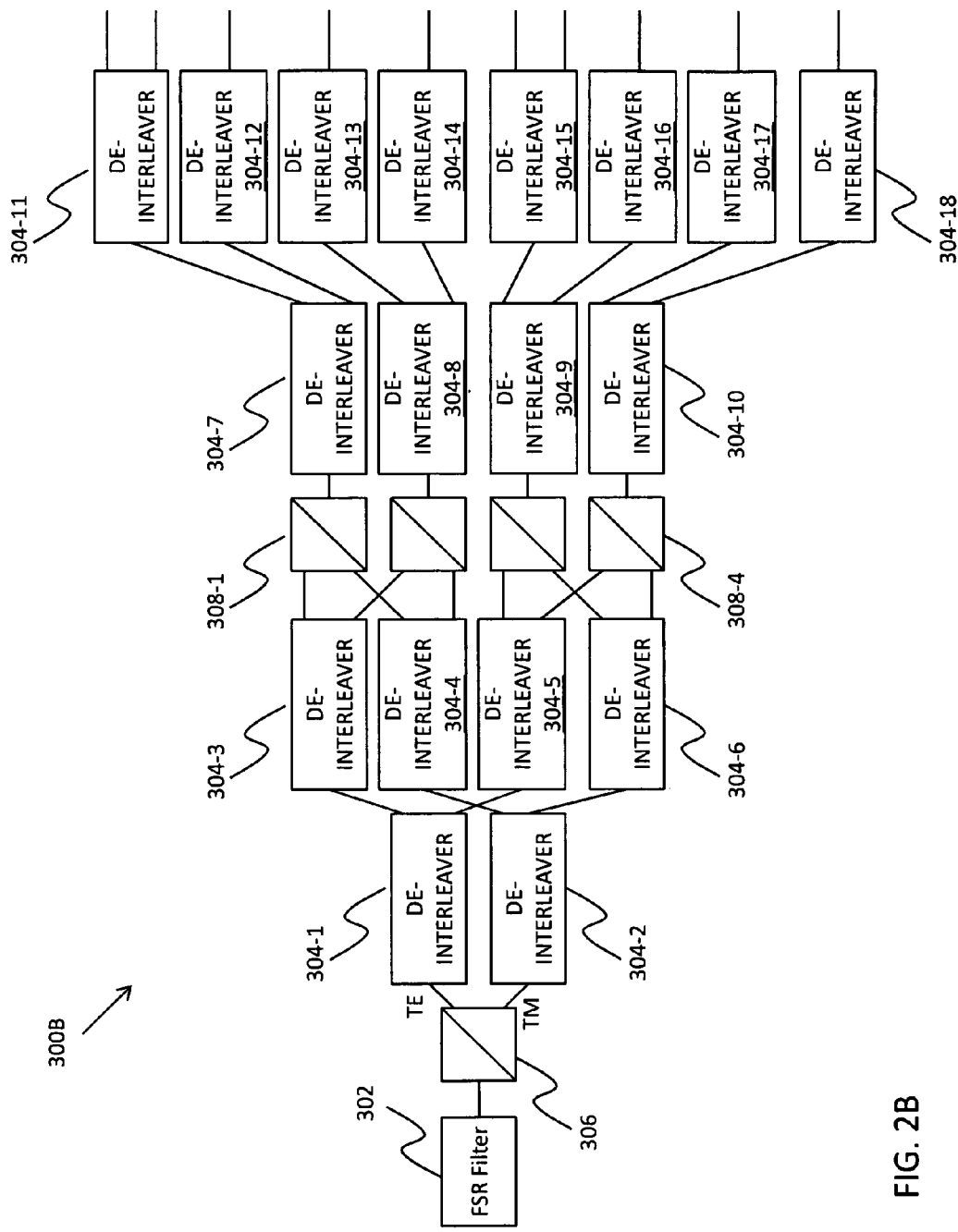

Additional optical elements, such as Polarization Beam Splitters (PBS) and other filtering devices, may be added to the demultiplexer 300A in order to improve the response of the demux 300A. For example, the demux 300B illustrated in FIG. 2B is an alternative embodiment of demux 300 which includes an FSR filter 302 that receives a WDM optical input signal. The WDM input signal is filtered and output to a PBS 306. The PBS 306 separates the WDM optical input signal into a Transverse Electric (TE) mode and a Transverse Magnetic (TM) mode, which are output to respective de-interleavers 304-1 and 304-2. De-interleavers 304-1 and 304-2 separate the channels of the WDM input signal as described above with respect to FIG. 2A. De-interleaver 304-1 outputs separated channels, e.g., a subset of channels, to de-interleaver 304-3 and de-interleaver 304-5. Similarly, de-interleaver 304-2 outputs separated channels to de-interleaver 304-4 and de-interleaver 304-6.

De-interleaver 304-3 separates the channels of the optical signal received from de-interleaver 304-1 and outputs a portion or subset of these channels to a Polarization Beam Coupler (PBC) 308-1 and the other portion or subset of the channels is output to PBC 308-2. De-interleaver 304-4 separates the channels of the optical signal received from de-interleaver 304-2 and outputs a portion of the channels to PBC 308-1 and the other portion of the channels to PBC 308-2. De-interleavers 304-5 and 304-6 similarly separate the channels of the optical signals received from de-interleavers 304-1 and 304-2 and output subsets of the channels to PBC 308-3 and PBC 308-4.

PBC 308-1 combines the polarized modes, TE and TM, of the optical signals received from de-interleavers 304-3 and 304-4 and outputs an optical signal having a mixed polarity to de-interleaver 304-7. Similarly, PCB 308-2 combines the optical signals received from de-interleavers 304-3 and 304-4, PBC 308-3 combines the optical signals received from de-interleavers 304-5 and 304-6, and PBC 308-4 combines the optical signals received from de-interleavers 304-5 and 304-6. Each of the PBCs 308-2 through 308-4 respectively output an optical signal having a mixed polarity to de-interleavers 304-8 through 304-10. De-interleavers 304-7 through 304-10 are polarization insensitive and respectively receive the mixed polarity optical signals from PBCs 308-1 through 308-4 and separate the channels of these optical signals. Each of the de-interleavers 304-7 through 304-10 output the separated channels to de-interleavers 304-11 through 304-18 as described above with respect to FIG. 2A. De-interleavers 304-11 through 304-18 then output a single channel, e.g., optical signal of a single wavelength, of the WDM optical input signal at an output.

Figure 2C:
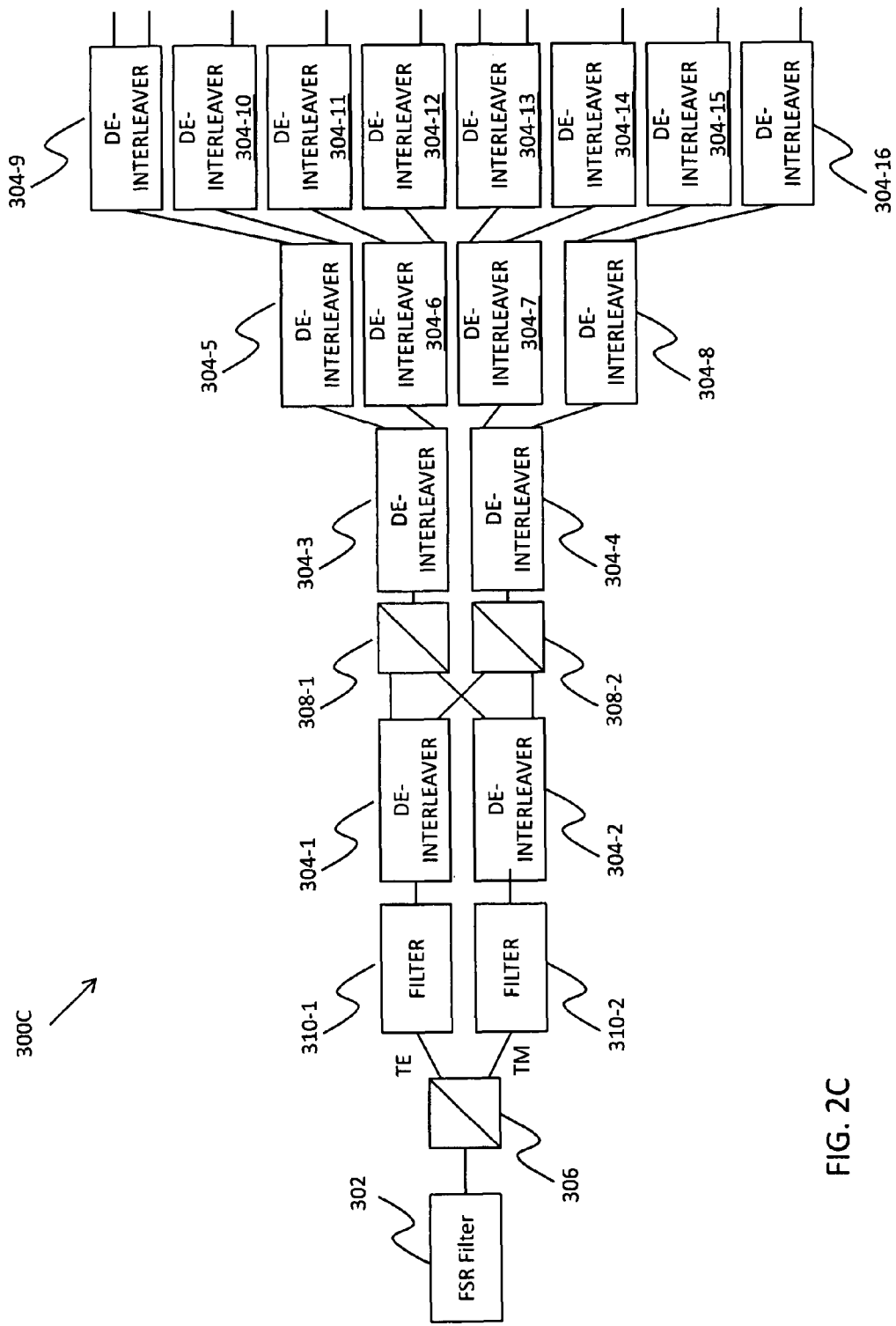

FIG. 2C illustrates another embodiment of demux 300 shown in FIG. 1 referenced as demux 300C having filters 310-1 and 310-2 disposed between PBS 306 and de-interleavers 304-1 and 304-2. The de-interleavers 304-1 and 304-2 respectively receive a polarized and filtered optical signal from filters 310-1 and 3 10-2. Each of the de-interleavers 304-1 and 304-2 separates the received optical signal into two optical signals, each of which includes a portion or subset of channels received from filters 310-1, 310-2. De-interleaver 304-1 outputs an optical signal including a portion of the received channels to an optical combiner 308-1 and outputs another optical signal including the remaining channels to an optical combiner 308-2. Similarly, de-interleaver 304-2 outputs an optical signal including a portion of the channels to optical combiner 308-1 and outputs another optical signal including the remaining channels to optical combiner 308-2. The optical signals received at optical combiner 308-1 from de-interleavers 304-1 and 304-2 may have the same wavelengths, but different polarizations. Similarly, the optical signals received at optical combiner 308-2 from de-interleavers 304-1 and 304-2 have the same wavelengths, but different polarizations. Optical combiners 308-1 and 308-2 are configured to combine the optical signals received from de-interleavers 304-1 and 304-2 to form optical signals of mixed polarity. These mixed polarity optical signals are then output from optical combiners 308-1 and 308-2 to de-interleavers 304-3 and 304-4, respectively, where the channels are further separated. Several additional levels de-interleavers 304 may be implemented until an de-interleaver 304 outputs a single channel or wavelength as described above with respect to FIGS. 2A and 2B.

Figure 3:
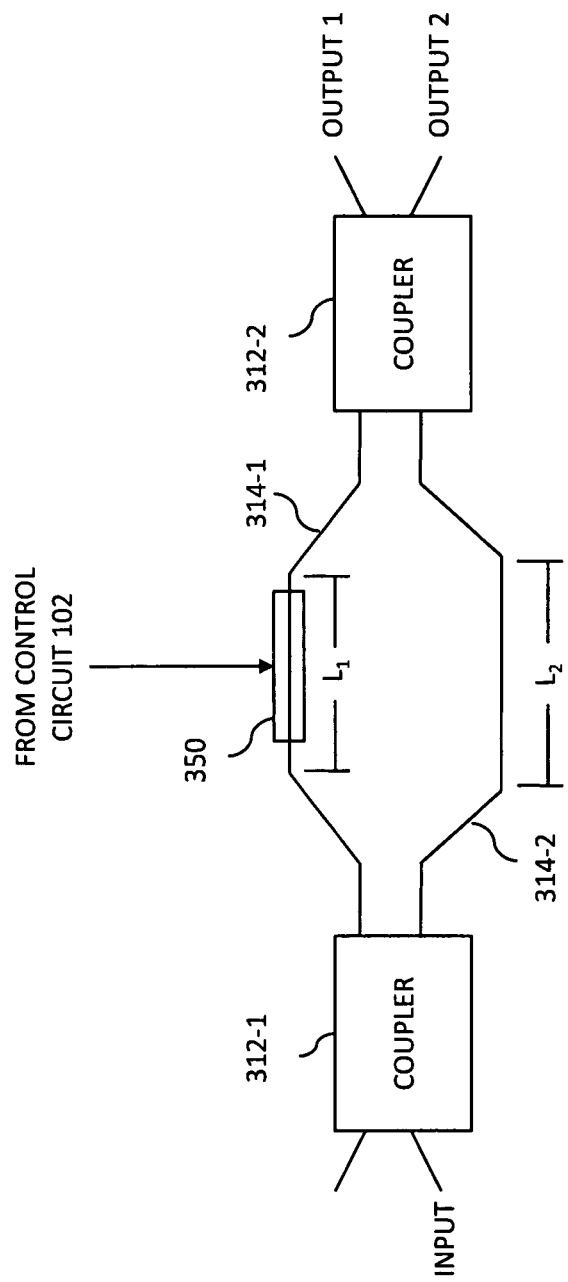
FIG. 3 illustrates a Mach-Zehnder interferometer in accordance with the optical demultiplexers illustrated in FIGS. 3A-3C.

FIG. 3 illustrates an exemplary embodiment of a de-interleaver 304 shown as a MZ interferometer which includes an input port, first and second splitters 312-1 and 312-2, first and second waveguides 314-1 and 314-2 extending between the splitters 312-1 and 312-2, and two output ports (output 1 and Output 2). The length, $L_1$, of the first waveguide 314-1 is different than the length, $L_2$, of the second waveguide 314-2 such that the wavelengths of the optical signals traveling along the first and second waveguides 314-1 and 314-2 of the MZ interferometer interfere constructively at one port and destructively at the other. The constructive and destructive interference of certain wavelengths of the optical signals enables the MZ interferometer to de-interleave (i.e. separate or demux) the wavelengths or channels of the WDM input signal.

A thin-film resistive heater 350 is thermally coupled to one of the waveguides 314 of the MZ interferometer to change the index of waveguide 314 by use of the thermal optic effect thereby tuning the transmission characteristics of the waveguide 314 to particular optical channel(s). Examples of materials from which the thin-film heaters may be fabricated include, but are not limited to, TiWN, W, Pt/Ti, Pt, TaN, NiCr, or the like. These materials may be disposed over waveguide 314 and electrically coupled to a power supply (not shown) and to the control circuit 102. The control circuit 102 is configured to adjust at least one of the power, current, or voltage applied to the heater 350 based on parameter values stored in memory 106. For example, when control circuit 102 receives a first OCG identifier signal, control circuit 102 determines the parameter values to supply to MZ heater 350 based on a look-up table stored in memory 106 corresponding to that particular OCG identifier. The parameter values may be power, current, or voltage to be applied to heater 350. Based on these parameters supplied to the heater, the thermal optic effect of waveguide 314-1 is controlled such that the MZ outputs a first plurality of wavelengths having an associated spectral spacing which corresponds to a first channel transmission grid or a multiple of that grid as the different de-interleavers of the demux circuit 300 have spacings of each multiple of the grid, e.g., 400 GHz, then 800 GHz, then 1600 GHz, etc. Thus, the OCG identifier corresponds to a particular OCG having wavelengths to be demultiplexed by the MZ. When a second or different OCG identifier is supplied to control circuit 102, a second set of parameter values are obtained from the look-up table stored in memory 106 which determines the power, current, or voltage applied to heater 350. Based on the parameters supplied to the heater 350, the thermal optic effect of waveguide 314-1 is changed such that the MZ outputs a second plurality of wavelengths having an associated spectral spacing which corresponds to a second channel transmission grid. In this manner, the MZ may be tuned, or reconfigured based on an OCG identifier signal, to select an OCG having a particular spectral spacing.

Heating the waveguides of the MZ not only enable the demultiplexer 300 to be tuned to a particular frequency grid, but it also enables the demultiplexer 300 to be tuned to output certain wavelengths and frequencies at certain ports. For example, the waveguides of the de-interleavers 304-1 of the demultiplexer 300A illustrated in FIG. 2A may be heated such that channels 1, 3, 5, 7, and 9 having particular wavelengths are output from the port which is shown to output channels 2, 4, 6, 8, and 10, and vice versa. Accordingly, each of the waveguides of each of the de-interleavers may be heated to vary the output port at which certain frequencies are output and consequently vary the frequencies received by the next de-interleaver 304 at the next subsequent level of de-interleavers.

Figure 4:
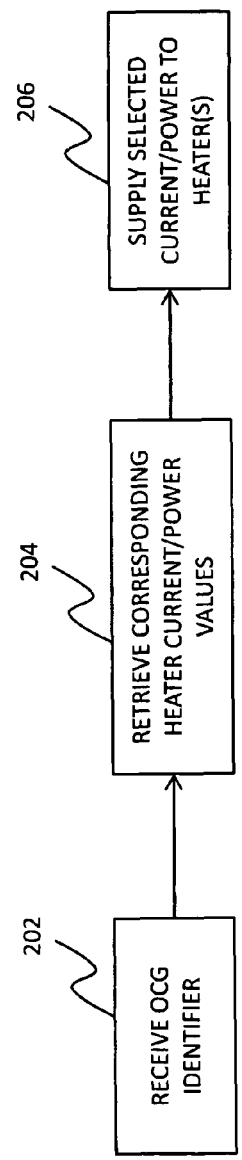
FIG. 4 is a flow diagram of one example of a method performed by the control circuit of the tunable optical system illustrated in FIG. 1.

FIG. 4 is a flow chart illustrating the operation of the tunable optical demux. At step 202, the control circuit 102 receives an OCG identification signal. As described above, the OCG identification signal may be received from a network controller and identify particular wavelengths included in a wavelength division multiplexed (WDM) optical input signal received at an input of optical demux 300. Additionally, an OCG identification signal may also be received in a closed loop system implementation wherein feedback from the outputs of the demux 300 is used as the OCG identification signal. At step 204, the processor 104 retrieves corresponding parameter values from the memory 106 based on the OCG identifier. The parameter values may identify the power, current, or voltage to be applied to the array of one or more heaters 350 that are thermally coupled to de-interleavers 304 to tune the demux 300 to demux a particular OCG included in the WDM optical input signal received at the input of the demux 300. At step 206, the appropriate power, current, or voltage is applied to the heaters 350 to tune the response of the demux 300.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An optical device, comprising:
an optical demultiplexer; and
a control circuit coupled to the optical demultiplexer, the control circuit including a memory configured to store first and second parameter values, the memory being selected from the group consisting of a read only memory and a random access memory, wherein, in response to a first input to the control circuit, the control circuit generates a first control signal based on the first parameter value, and, in response to the first control signal, the optical demultiplexer has a first transmission characteristic, which includes a first plurality of transmission maxima, each of which corresponding to a first plurality of wavelengths, each of the first plurality of wavelengths being separated from one another by a spectral spacing and conforming to a first wavelength grid,
in response to a second input to the control circuit, the control circuit generates a second control signal based on the second parameter value, and, in response to the second control signal, the optical demultiplexer has a second transmission characteristic, which includes a second plurality of transmission maxima, each of which corresponding to a second plurality of wavelengths, each of the second plurality of wavelengths being separated from one another by the spectral spacing and conforming to a second wavelength grid, the second wavelength grid being spectrally shifted relative to the first wavelength grid; and
a heater,
wherein the optical demultiplexer includes an optical de-interleaver and
wherein the heater is thermally coupled to the optical de-interleaver and the control signal includes a first electrical current or a second electrical current, the control signal being supplied to the heater, such that, when the control signal includes the first electrical current, the optical demultiplexer has a first temperature and a first transmission characteristic, and, when the control signal includes the second electrical current, the optical demultiplexer has a second temperature and a second transmission characteristic.

2. The optical device of claim 1, wherein the de-interleaver is a Mach-Zehnder interferometer.

3. The optical device of claim 1, wherein the optical demultiplexer includes a first Mach-Zehnder (MZ) interferometer including an input, first and second waveguides, and a pair of outputs, the first MZ interferometer receiving a wavelength division multiplexed (WDM) optical input signal having a plurality of channels, each of the channels corresponding to a wavelength, the MZ interferometer configured to output a first subset of the plurality of channels at the first output and a second subset of-the plurality of channels at a second output.

4. The optical device of claim 3, further comprising:
second and third MZ interferometers each coupled to a respective output of the first MZ interferometer, the second and third MZ interferometers configured to receive a respective one of the first and second subsets of channels output by the first MZ interferometer.

5. The optical device of claim 4, wherein at least one waveguide of each of the first, second, and third MZ interferometers is thermally coupled to a heater.

6. The optical device of claim 5, further comprising:
fourth and fifth MZ interferometers each coupled to a respective output of the second MZ interferometer, the fourth and fifth MZ interferometers configured to respectively receive third and fourth subsets of channels from the second MZ device; and
sixth and seventh MZ interferometers each coupled to a respective output of the third MZ interferometer, the sixth and seventh interferometers configured to respectively receive fifth and sixth subsets of channels from the third MZ device.

7. An optical device, comprising:
an optical demultiplexer including a plurality of outputs;
a control circuit including a memory configured to store first and second parameter values, the memory being selected from the group consisting of a read only memory and a random access memory, the control circuit in signal communication with the optical demultiplexer; and
a heater,
wherein, in response to a first input to the control circuit, the control circuit generates a first control signal based on the first parameter value, and, in response to the first control signal, the optical demultiplexer outputs a first plurality of optical signals at a corresponding one of the plurality of outputs, each of the plurality of optical signals has a corresponding one of a first plurality of wavelengths, each of the first plurality of wavelengths being separated from one another by a spectral spacing and conforming to a first wavelength grid,
in response to a second input to the control circuit, the control circuit generates a second control signal based on the second parameter value, and, in response to the second control signal, the optical demultiplexer outputs a second plurality of optical signals at a respective one of the plurality of outputs, each of the second plurality of optical signals corresponding to one of a second plurality of wavelengths, each of the second plurality of wavelengths being separated from one another by the spectral spacing and conforming to a second wavelength grid, the second wavelength grid being spectrally shifted relative to the first wavelength grid,
the optical demultiplexer includes a first optical de-interleaver,
the heater is thermally coupled to the optical de-interleaver, and
wherein the control signal includes a first electrical current or a second electrical current, the control signal being supplied to the heater, such that, when the control signal includes the first electrical current, the heater has a first temperature and the optical demultiplexer has a first transmission characteristic and when the control signal includes the second electrical current, the heater has a second temperature and the optical demultiplexer has a second transmission characteristic.

8. The optical device of claim 7, wherein the optical de-interleaver is a Mach-Zehnder interferometer having first and second waveguides, and wherein the heater is thermally coupled to at least one of the first and second waveguides.

9. The optical device of claim 7, wherein the optical demultiplexer includes a second optical de-interleaver, the demultiplexer further comprising:
a polarization beam splitter configured to receive a wavelength division multiplexed (VVDM) optical input signal at an input and output a first polarized optical signal to the first optical de-interleaver and a second polarized optical signal to the second optical de-interleaver.

10. The optical device of claim 9, further comprising:
first and second polarization beam splitters each coupled to an output of the first and second optical de-interleavers, the first and second polarization beam splitters configured to receive polarized optical signals including first and second channel subsets of the WDM input signal and output channel subsets of mixed polarity.

11. The optical device of claim 10, wherein the first and second optical de-interleavers are Mach-Zehnder interferometers each including a pair of waveguides.

12. The optical device of claim 11, wherein at least one waveguide of each of the first and second MZ interferometers is thermally coupled to a thin-film resistive heater.

13. The optical device of claim 12, wherein the thin-film resistive heater is coupled to the control circuit, and wherein the first and second control signals identify an amount of power delivered to the thin-film resistive heater.

14. The optical device of claim 7, wherein the first and second inputs to the control circuit identify a range of frequencies of an optical signal received at an input of the optical demultiplexer.

15. An optical device, comprising:
an optical demultiplexer; and
a control circuit coupled to the optical demultiplexer, the control circuit including a memory configured to store first and second parameter values, wherein, in response to a first input to the control circuit, the control circuit generates a first control signal based on the first parameter value, and, in response to the first control signal, the optical demultiplexer has a first transmission characteristic, which includes a first plurality of transmission maxima, each of which corresponding to a first plurality of wavelengths, each of the first plurality of wavelengths being separated from one another by a spectral spacing and conforming to a first wavelength grid, and
in response to a second input to the control circuit, the control circuit generates a second control signal based on the second parameter value, and, in response to the second control signal, the optical demultiplexer has a second transmission characteristic, which includes a second plurality of transmission maxima, each of which corresponding to a second plurality of wavelengths, each of the second plurality of wavelengths being separated from one another by the spectral spacing and conforming to a second wavelength grid, the second wavelength grid being spectrally shifted relative to the first wavelength grid,
wherein the optical demultiplexer includes an optical de-interleaver, the optical device, further including:
a heater thermally coupled to the optical de-interleaver, wherein the control signal includes a first electrical current or a second electrical current, the control signal being supplied to the heater, such that, when the control signal includes the first electrical current, the optical demultiplexer has a first temperature and a first transmission characteristic, and, when the control signal includes the second electrical current, the optical demultiplexer has a second, temperature and a second transmission characteristic.

16. The optical device of claim 15, wherein the de-interleaver is a Mach-Zehnder interferometer.

17. An optical device, comprising:
an optical demultiplexer; and
a control circuit coupled to the optical demultiplexer, the control circuit including a memory configured to store first and second parameter values, wherein, in response to a first input to the control circuit, the control circuit generates a first control signal based on the first parameter value, and, in response to the first control signal, the optical demultiplexer has a first transmission characteristic, which includes a first plurality of transmission maxima, each of which corresponding to a first plurality of wavelengths, each of the first plurality of wavelengths being separated from one another by a spectral spacing and conforming to a first wavelength grid, and
in response to a second input to the control circuit, the control circuit generates a second control signal based on the second parameter value, and, in response to the second control signal, the optical demultiplexer has a second transmission characteristic, which includes a second plurality of transmission maxima, each of which corresponding to a second plurality of wavelengths, each of the second plurality of wavelengths being separated from one another by the spectral spacing and conforming to a second wavelength grid, the second wavelength grid being spectrally shifted relative to the first wavelength grid,
wherein the optical demultiplexer includes a first Mach-Zehnder (MZ) interferometer including an input, first and second waveguides, and a pair of outputs, the first MZ interferometer receiving a wavelength division multiplexed (WDM) optical input signal having a plurality of channels, each of the channels corresponding to a wavelength, the MZ interferometer configured to output a first subset of the plurality of channels at the first output and a second subset of the plurality of channels at a second output.

18. The optical device of claim 17, further comprising:
second and third MZ interferometers each coupled to a respective output of the first MZ interferometer, the second and third MZ interferometers configured to receive a respective one of the first and second subsets of channels output by the first MZ interferometer.

19. The optical device of claim 18, wherein at least one waveguide of each of the first, second, and third MZ interferometers is thermally coupled to a heater.

20. The optical device of claim 19, further comprising:
fourth and fifth MZ interferometers each coupled to a respective output of the second MZ interferometer, the fourth and fifth MZ interferometers configured to respectively receive third and fourth subsets of channels from the second MZ device; and
sixth and seventh MZ interferometers each coupled to a respective output of the third MZ interferometer, the sixth and seventh interferometers configured to respectively receive fifth and sixth subsets of channels from the third MZ device.

21. An optical device, comprising:
an optical demultiplexer including a plurality of outputs; and
a control circuit including a memory configured to store first and second parameter values, the control circuit in signal communication with the optical demultiplexer,
wherein, in response to a first input to the control circuit, the control circuit generates a first control signal based on the first parameter value, and, in response to the first control signal, the optical demultiplexer outputs a first plurality of optical signals at a corresponding one of the plurality of outputs, each of the plurality of optical signals has a corresponding one of a first plurality of wavelengths, each of the first plurality of wavelengths being separated from one another by a spectral spacing and conforming to a first wavelength grid, and
in response to a second input to the control circuit, the control circuit generates a second control signal based on the second parameter value, and, in response to the second control signal, the optical demultiplexer outputs a second plurality of optical signals at a respective one of the plurality of outputs, each of the second plurality of optical signals corresponding to one of a second plurality of wavelengths, each of the second plurality of wavelengths being separated from one another by the spectral spacing and conforming to a second wavelength grid, the second wavelength grid being spectrally shifted relative to the first wavelength grid,
wherein the optical demultiplexer includes a first optical de-interleaver, the optical device further including a heater thermally coupled to the optical de-interleaver,
wherein the control signal includes a first electrical current or a second electrical current, the control signal being supplied to the heater, such that, when the control signal includes the first electrical current, the heater has a first temperature and the optical demultiplexer has a first transmission characteristic, and, when the control signal includes the second electrical current, the heater has a second temperature and the optical demultiplexer has a second transmission characteristic.

22. The optical device of claim 21, wherein the optical de-interleaver is a Mach-Zehnder interferometer having first and second waveguides, and wherein the heater is thermally coupled to at least one of the first and second waveguides.

23. An optical device, comprising:
an optical demultiplexer including a plurality of outputs; and
a control circuit including a memory configured to store first and second parameter values, the control circuit in signal communication with the optical demultiplexer,
wherein, in response to a first input to the control circuit, the control circuit generates, a first control signal based on the first parameter value, and, in response to the first control signal, the optical demultiplexer outputs a first plurality of optical signals at a corresponding one of the plurality of outputs, each of the plurality of optical signals has a corresponding one of a first plurality of wavelengths, each of the first plurality of wavelengths being separated from one another by a spectral spacing and conforming to a first wavelength grid, and
in response to a second input to the control circuit, the control circuit generates a second control signal based on the second parameter value, and, in response to the second control signal, the optical demultiplexer outputs a second plurality of optical signals at a respective one of the plurality of outputs, each of the second plurality of optical signals corresponding to one of a second plurality of wavelengths, each of the second plurality of wavelengths being separated from one another by the spectral spacing and conforming to a second wavelength grid, the second wavelength grid being spectrally shifted relative to the first wavelength grid,
wherein the optical demultiplexer includes a first optical de-interleaver,
wherein the optical demultiplexer includes a second optical de-interleaver, the demultiplexer further comprising:
a polarization beam splitter configured to receive a wavelength division multiplexed (WDM) optical input signal at an input and output a first polarized optical signal to the first optical de-interleaver and a second polarized optical signal to the second optical de-interleaver.

24. The optical device of claim 23, further comprising:
first and second polarization beam splitters each coupled to an output of the first and second optical de-interleavers, the first and second polarization beam splitters configured to receive polarized optical signals including first and second channel subsets of the WDM input signal and output channel subsets of mixed polarity.

25. The optical device of claim 24, wherein the first and second optical de-interleavers are Mach-Zehnder interferometers each including a pair of waveguides.

26. The optical device of claim 25, wherein at least one waveguide of each of the first and second MZ interferometers is thermally coupled to a thin-film resistive heater.

27. The optical device of claim 26, wherein the thin-film resistive heater is coupled to the control circuit, and wherein the first and second control signals identify an amount of power delivered to the thin-film resistive heater.

* * * * *